(12) United States Patent
Haas et al.

(10) Patent No.: US 9,814,245 B2
(45) Date of Patent: Nov. 14, 2017

(54) MIXING APPARATUS

(71) Applicant: HAAS FOOD EQUIPMENT GMBH, Vienna (AT)

(72) Inventors: Johannes Haas, Vienna (AT); Josef Haas, Leobendorf (AT); Stefan Jiraschek, Koenigsbrunn (AT); Jozsef Budai, Korneuburg (AT)

(73) Assignee: Haas Food Equipment GmbH, Vienna (AT)

( * ) Notice: Subject to any disclaimer, the term of this patent is extended or adjusted under 35 U.S.C. 154(b) by 362 days.

(21) Appl. No.: 14/410,175

(22) PCT Filed: Jun. 19, 2013

(86) PCT No.: PCT/EP2013/062741
§ 371 (c)(1),
(2) Date: Dec. 22, 2014

(87) PCT Pub. No.: WO2013/189983
PCT Pub. Date: Dec. 27, 2013

(65) Prior Publication Data
US 2015/0320053 A1     Nov. 12, 2015

(30) Foreign Application Priority Data

Jun. 21, 2012   (AT) .................. A 701/2012

(51) Int. Cl.
*B01F 7/16*     (2006.01)
*A21C 1/02*    (2006.01)
(Continued)

(52) U.S. Cl.
CPC .............. *A21C 1/02* (2013.01); *A21C 1/142* (2013.01); *B01F 7/0095* (2013.01);
(Continued)

(58) Field of Classification Search
CPC ........................................... B01F 7/163
(Continued)

(56) References Cited

U.S. PATENT DOCUMENTS

| 859,943 A | * | 7/1907 | Holden | ................ B01F 13/002 366/281 |
| 1,279,515 A | * | 9/1918 | Coleman | ............... B01F 13/002 366/285 |

(Continued)

FOREIGN PATENT DOCUMENTS

| DE | 1017145 B | 10/1957 |
| DE | 93948 A | 11/1972 |

(Continued)

*Primary Examiner* — David Sorkin
(74) *Attorney, Agent, or Firm* — Laurence A. Greenberg; Werner H. Stemer; Ralph E. Locher

(57) ABSTRACT

A mixing apparatus has a mixing container disposed in the upper part of the mixing apparatus, preferably standing on a frame, which is open towards the top. The mixing container includes a single-shaft agitator disposed in the lower part of the mixing apparatus. The agitator has a vertically disposed agitator shaft to which is fastened an agitating tool configured as a rotor body which is disposed in the mixing container just above the container base. The single-shaft agitator is a statorless agitator and the rotor body fastened to the agitator shaft is surrounded by an external free space between the rotor body and the container wall of the mixing container. The agitator shaft is adjustable in its spacing distance from the cylinder axis.

24 Claims, 12 Drawing Sheets

(51) Int. Cl.
*A21C 1/14* (2006.01)
*B01F 7/00* (2006.01)

(52) U.S. Cl.
CPC .......... *B01F 7/00225* (2013.01); *B01F 7/162* (2013.01); *B01F 7/163* (2013.01); *B01F 7/168* (2013.01)

(58) Field of Classification Search
USPC .............................. 366/205, 207, 285, 314
See application file for complete search history.

(56) References Cited

U.S. PATENT DOCUMENTS

| | | | |
|---|---|---|---|
| 2,086,858 | A | 7/1937 | Dunkelberger |
| 4,577,975 | A | 3/1986 | McCrory et al. |
| 8,753,004 | B2 | 6/2014 | Miller et al. |
| 2011/0262606 | A1 | 10/2011 | Blondel et al. |
| 2012/0275260 | A1* | 11/2012 | Haas ........................ A21C 1/02 366/314 |

FOREIGN PATENT DOCUMENTS

| | | |
|---|---|---|
| DE | 102010042542 A1 | 4/2011 |
| EP | 2465352 A1 | 6/2012 |
| GB | 1410383 A | 10/1975 |
| WO | 03001954 A1 | 1/2003 |
| WO | 2009030798 A1 | 3/2009 |
| WO | 2011114469 A1 | 9/2011 |
| WO | 2011155385 A1 | 12/2011 |

\* cited by examiner

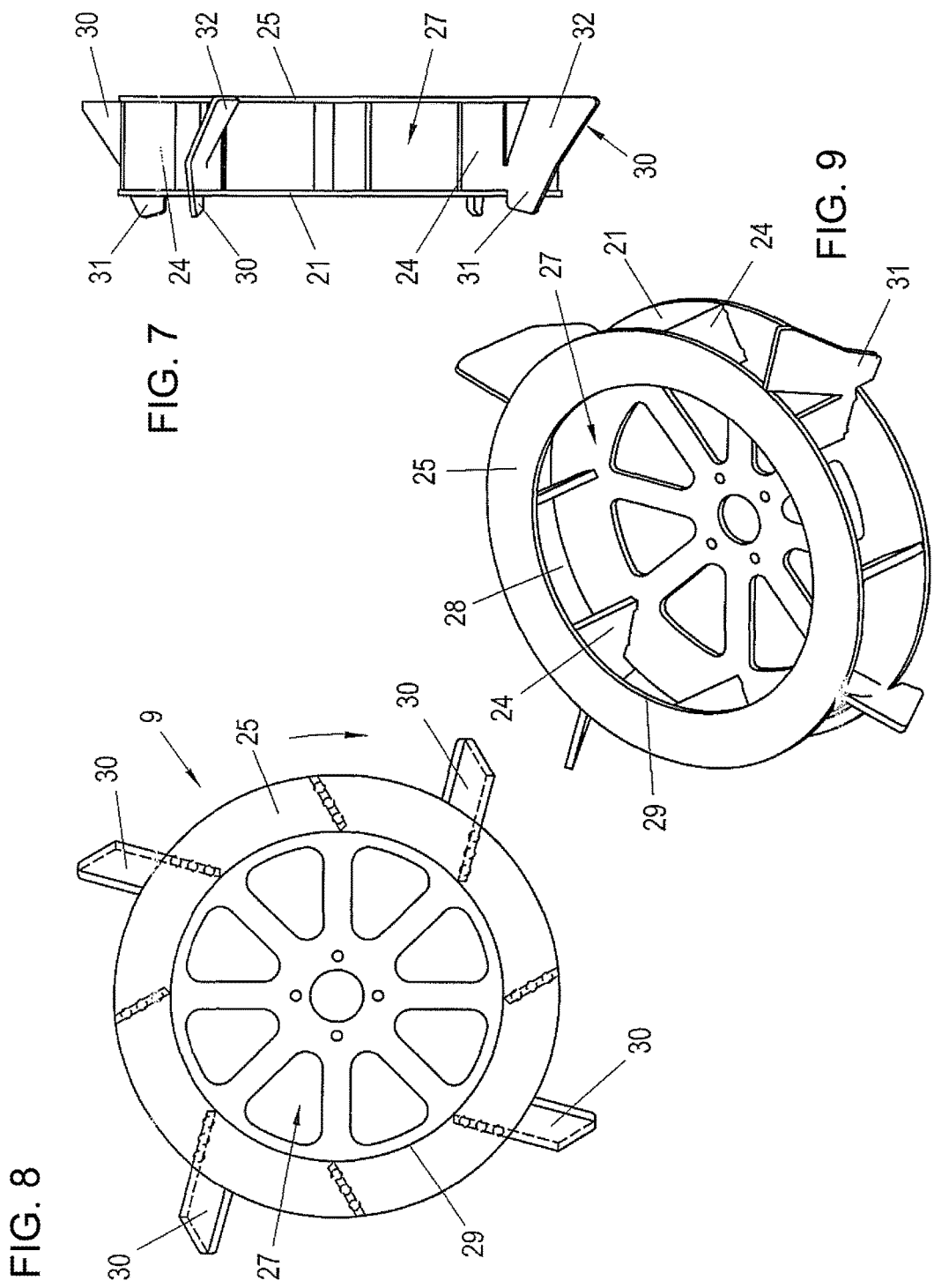

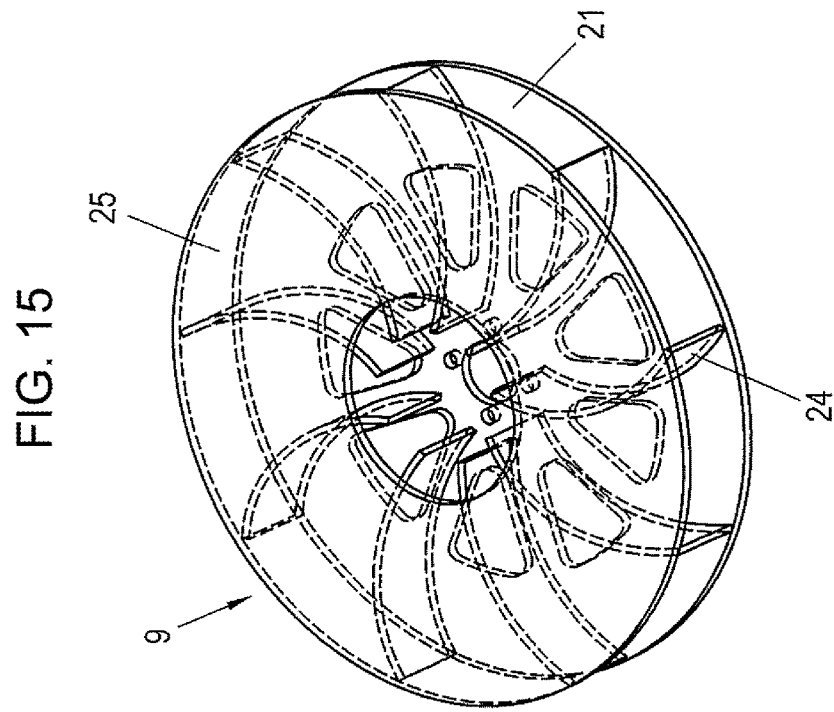
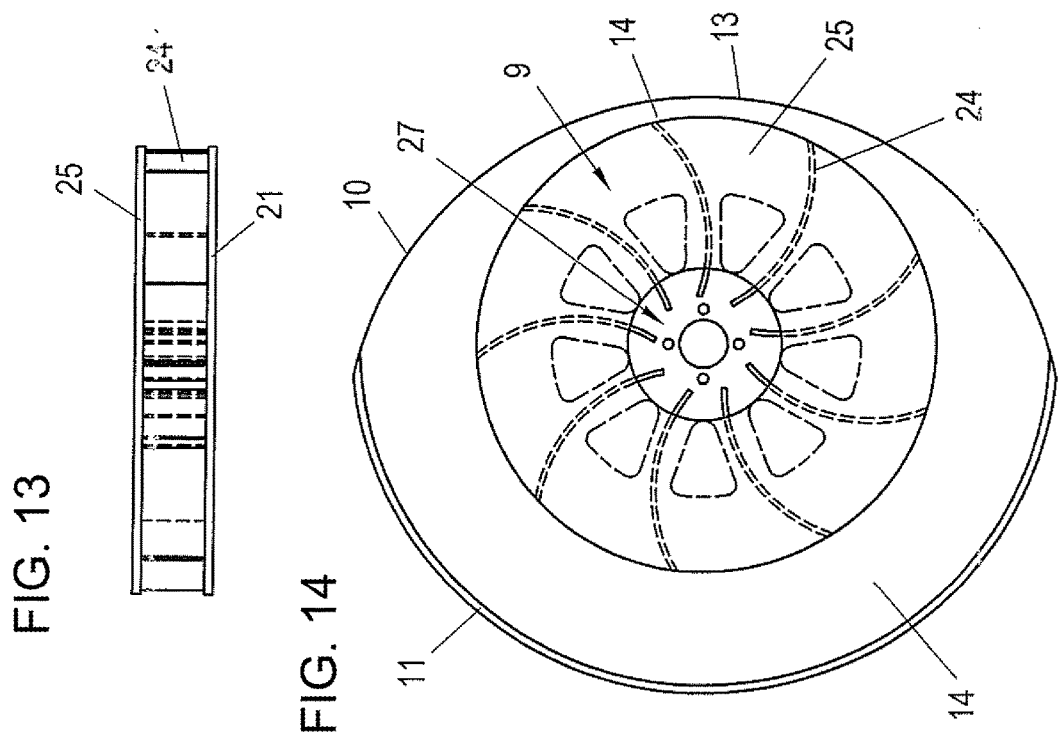

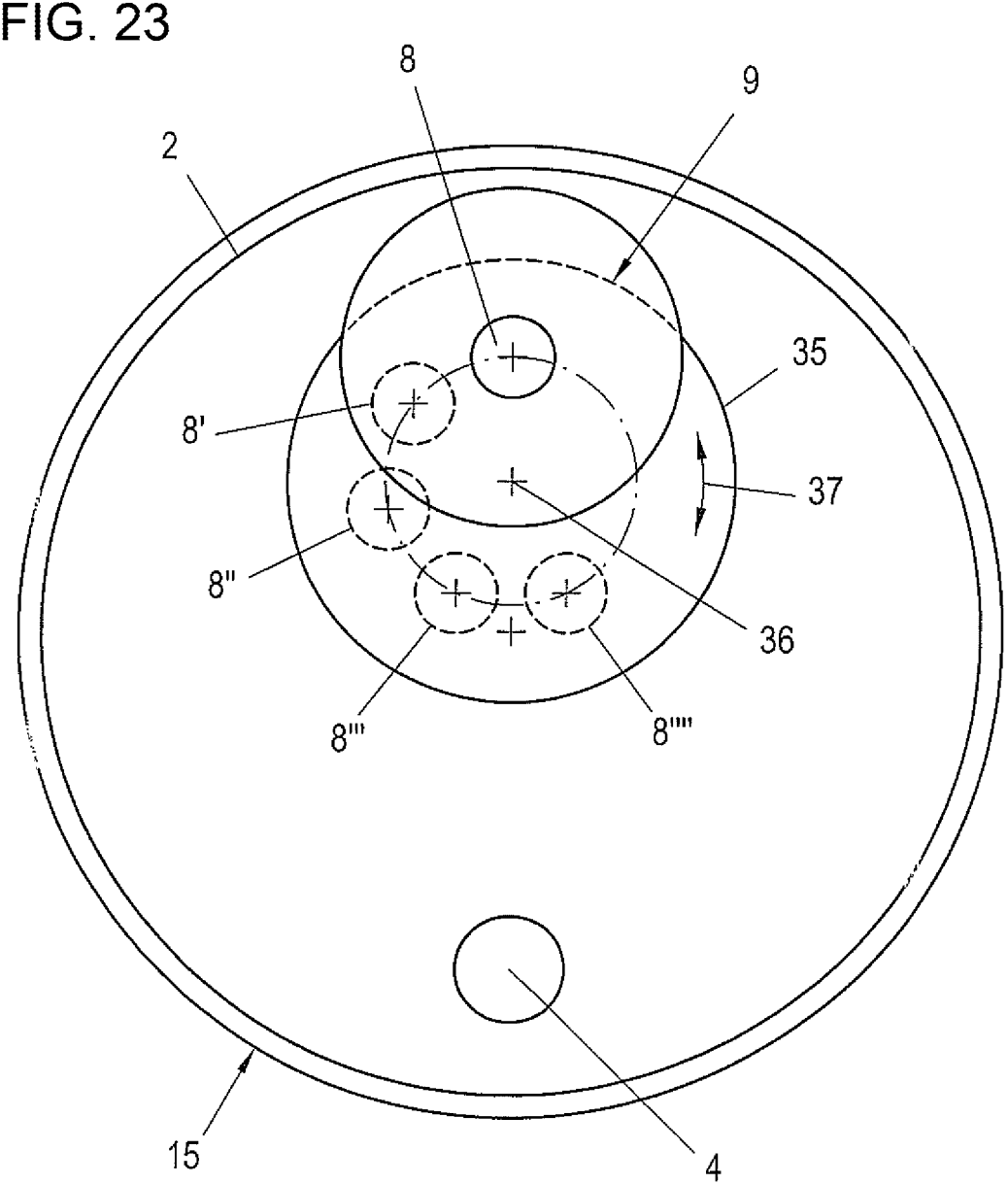

MIXING APPARATUS

BACKGROUND OF THE INVENTION

Field of the Invention

The invention relates to a mixing apparatus comprising a mixing container disposed in the upper part of the mixing apparatus, preferably standing on a frame, which is open towards the top or which can be closed with a cover, and which carries a single-shaft agitator disposed in the lower part of the mixing apparatus, which comprises a vertically disposed agitator shaft to which is fastened an agitating tool configured as a rotor body which is disposed in the mixing container just above the container base.

In such mixing apparatus, large quantities of shapeless masses are produced, which principally consist of water and flour, which mostly possess a liquid or paste-like consistency and from which edible baked products or baked products not provided for consumption are produced subsequently in a baking process. Such shapeless masses are, for example, the liquid baking preparations used in the baking process of wafer baking technology.

The liquid baking preparations principally consist of water and a powdery principal component, mostly wheat flour or a starch flour, or another cereal flour or a mixture of different cereal or starch flours. The liquid baking preparations also contain other powdery or liquid ingredients which each account for only a small fraction of the total quantity of the respective baking preparation and are usually introduced into the mixing container of the mixing apparatus together with the liquid fractions of the baking preparation or together with the powdery fractions of the baking preparation according to their respective consistency.

The baked products made from liquid baking preparations can be edible baking products such as are known, for example from soft wafers, the crispy-brittle wafer cones for ice cream or the crispy-brittle wafer sheets of cream-filled wafer slices.

The baked products produced from the liquid baking preparations can, however, also be other products not provided for consumption per se such as, for example, packaging articles such as packaging cups made of a starch-containing baking preparation or parts of tableware to be used only once made from such a baking preparation, such as knives, forks, spoons or plates and cups.

In known mixing apparatus for producing liquid baking preparation, a cylindrical mixing container which is disposed vertically in the upper part of the mixing apparatus and which is open at the top is provided, which receives the total quantity of the baking preparation to be produced and into which the liquid and powdery fractions of the baking preparation are introduced from above. Located in the mixing container just above the base are the stator and rotor of a single-shaft agitator which has a central axis concentric to the container central axis and whose rotor is driven by a drive motor disposed below the mixing container in the lower part of the mixing apparatus. The agitator provides an external annular stator which is provided with vertically disposed mixing vanes and which has flow channels for the substance to be mixed disposed between the mixing blades. The annular stator is disposed just above the base of the mixing container and is rigidly connected to the base of the mixing container. The agitator further provides a rotor disposed in the interior of the stator which has a circular base plate connected rigidly to the rotor drive shaft and an annular outer ring in which vertically disposed mixing vanes and flow channels for the substance to be mixed disposed between said vanes are provided.

In the known mixing apparatuses the cylindrical mixing container is matched with its volume to the batch of baking preparation to be mixed. There are therefore different-sized mixing apparatus for different-sized batches.

If the mixing container of the known mixing apparatus is only partially filled with the baking preparation to be produced, the predominant part of the total mass is certainly thoroughly mixed but insufficiently mixed mass residues can remain at the centre of the mixing container or on the container wall which must then be removed from the mixing container separately from the thoroughly mixed principal quantity of the baking preparation.

It is the object of the present invention to provide a mixer for commercial and industrial use in the field of baking preparations which overcomes the disadvantages of the prior art, achieved a good mixing of the components of the baking preparation and gives the resulting shapeless mass the consistency required for the subsequent processing and baking process. Furthermore, the mixer should be inexpensive to manufacture and easy to maintain and clean. The mixer should also achieve good results with different filled quantities.

BRIEF SUMMARY OF THE INVENTION

The mixing apparatus according to the invention is characterized in that the single-shaft agitator is configured as a statorless agitator, that the rotor body fastened to the agitator shaft is surrounded by an external free space which is disposed between the rotor body and the container wall of the mixing container and that the external free space has a variable cross-section along its circumference, at least in sections.

In a first embodiment the container wall has a first cylindrical wall section having the radius R1 concentric to the agitator shaft and a second curved wall section whose apex has a radial distance from the agitator shaft which is smaller than R1. Furthermore the second wall section can have a radius R2 whose curvature central point is shifted by about 4% to 30% of the radius R1 with respect to the agitator shaft.

The mixing container is formed from a cylindrical container wall which is open at the top, in which the second curved wall section is disposed and which is sealed with respect to the cylindrical container wall and the container base. In one embodiment the second wall section has a smaller height than the cylindrical container wall.

In a further embodiment, in the mixing apparatus the container wall is cylindrical and the agitator shaft is disposed parallel to and at a distance from the cylinder axis.

The diameter of the rotor body can, for example, be 45 to 75% of the inside diameter of the mixing container. The distance between cylinder axis and agitator shaft is preferably in the region of 2% to 15%, preferably 2.5% to 10% of the inside diameter of the mixing container. Preferably the mixing container can be closed at the top by a cover and it has feed devices such as filling openings for the dough ingredients to be mixed and nozzles for injecting liquid dough ingredients or cleaning liquids. Preferably the position of the feed devices is adjustable. Furthermore, an outlet tube can be disposed in the container base which can be closed or opened by a closing apparatus. Furthermore the container base is inclined towards the outlet tube.

The rotor body can have various configurations. It preferably comprises a base plate configured with openings and webs, where substantially radial mixing vanes are disposed on the webs and where a concentric terminating ring is provided parallel to the base plate.

The mixing vanes can be formed at a short radial distance from the agitator shaft beginning from a small initial height and ascending radially outwards towards the terminating ring.

The mixing vanes are preferably curved in the direction of rotation of the rotor body and the openings of the base plate each extend from the central region thereof as far as close to the outer edge thereof. In one embodiment, the webs each carry two mixing vanes. Further features of the invention are contained in the claims, the description and the figures.

BRIEF DESCRIPTION OF THE SEVERAL VIEWS OF THE DRAWING

The invention is described in detail hereinafter with reference to several exemplary embodiments.

FIGS. 7 to 9, 10 to 12, 13 to 15, 16 to 18 and 19, 20 show a further six embodiments of the rotor body which can also be used advantageously in the mixing apparatus.

FIG. 23 shows a schematic plan view.

DESCRIPTION OF THE INVENTION

Figure 1:
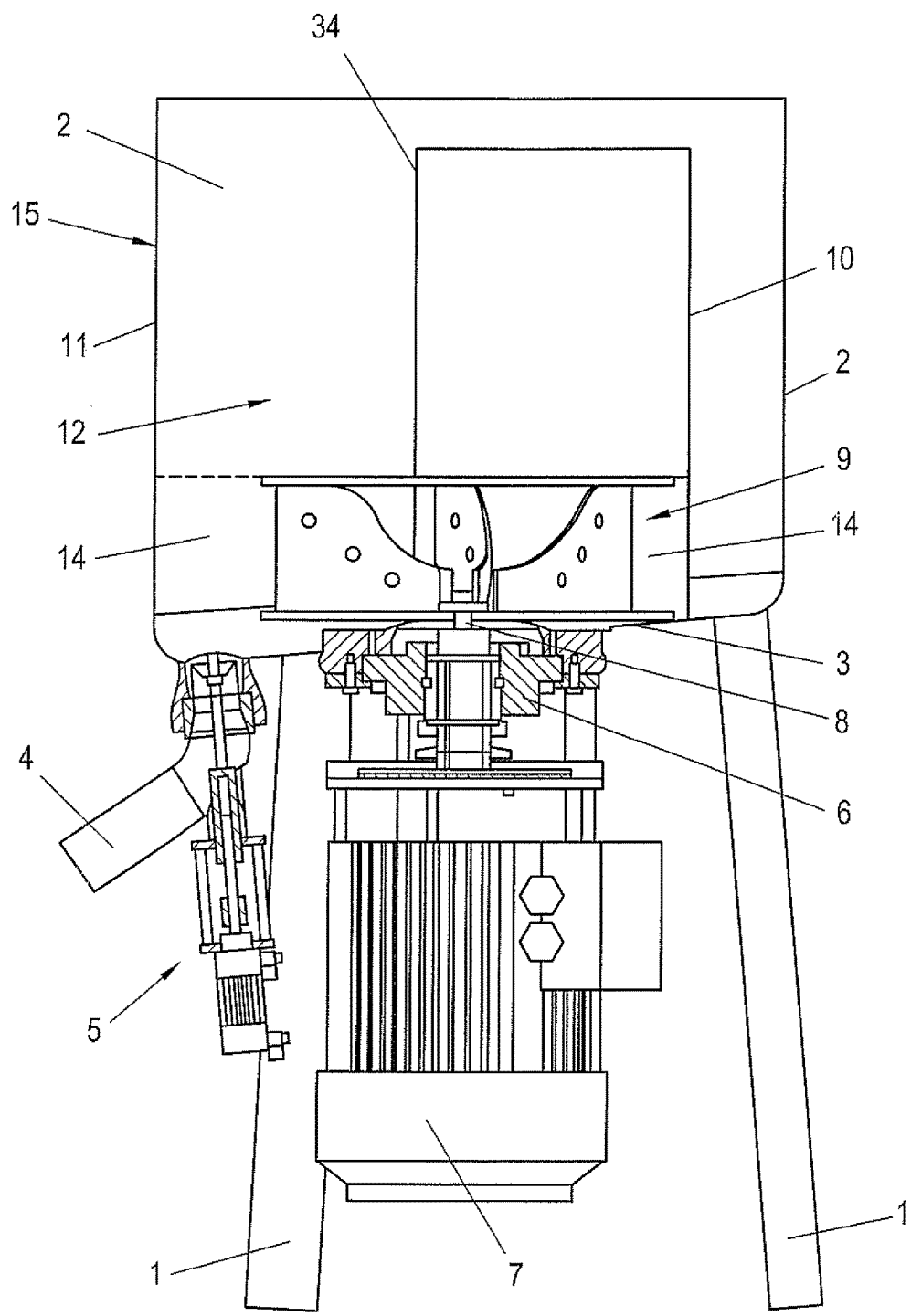
FIG. 1 shows schematically a partial section through an embodiment of the mixing apparatus according to the invention according to line I-I in FIG. 3.

FIGS. 1 to 4 show a mixing apparatus according to the invention in various sketches and views. The mixing apparatus comprises a frame 1 standing on the base. The frame 1 carries a container 15 which is disposed vertically in the upper part of the mixing apparatus and is open at the top, having a cylindrical container wall 2. As can be seen from FIG. 1, the container is terminated by an obliquely positioned container base 3 which is inclined in the direction of an outlet tube 4 and which can be closed and opened by a closure apparatus 5. A bearing plate 6 to which the agitator motor 7 is flange-mounted at the bottom sits centrally in the container base 3. The agitator motor 7 drives a vertically disposed drive shaft which projects upwards as far as into the mixing container 15 as agitator shaft 8. An agitator tool in the form of a rotor body 9 is disposed at the upper end of the agitator shaft 8. Located inside the cylindrical container 15 with the cylindrical container wall 2 is a second curved wall section 10 which is sealed both with respect to the cylindrical container wall 2 and also with respect to the container wall 3. Consequently, the mixing chamber 12 is only partly formed by the cylindrical container wall 2 since the mixing chamber 12 is asymmetrically constricted by the second curved wall section 10, as is readily apparent in FIG. 3.

The design for the mixing chamber just described is advantageous for reasons of cost and static reasons since the cylindrical container 15 with the cylindrical container wall 2 gives the mixing apparatus a high strength. With regard to the mixer function, however, only the first cylindrical wall section 11 and the second curved wall section 10 connected thereto, which enclose the mixing chamber 12, are of importance.

Figure 3:
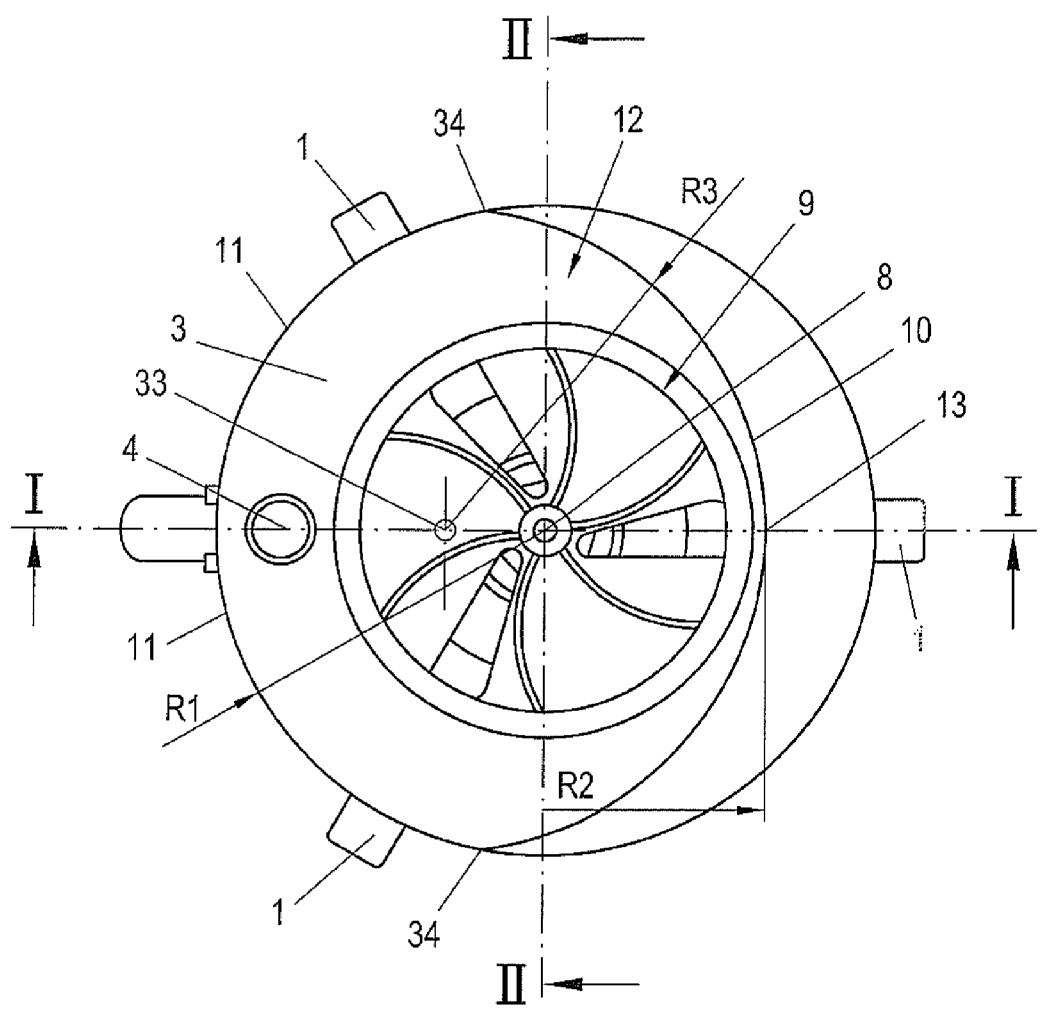
FIG. 3 shows a plan view of the mixing apparatus.
Figure 4:
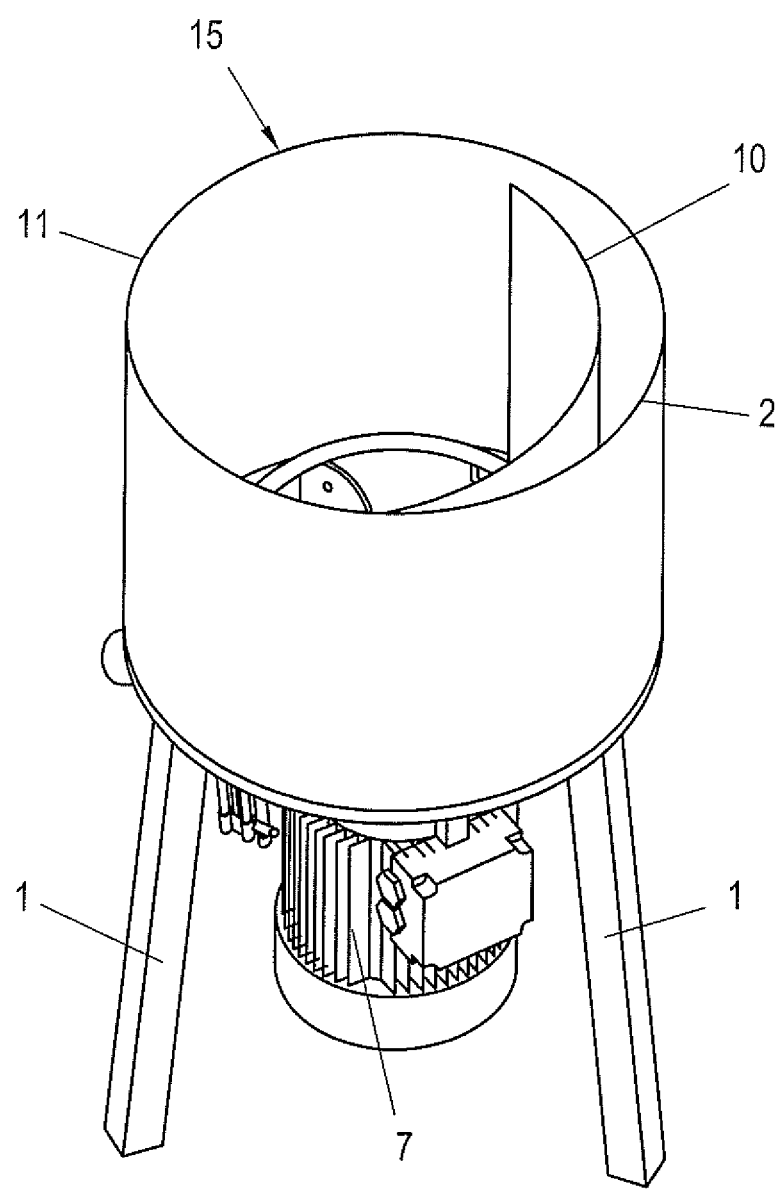
FIG. 4 is an oblique view of the mixing apparatus with cover removed.

As can be seen in FIG. 3, the rotor body 9 with its agitator shaft 8 sits asymmetrically in the mixing chamber 12. If the first cylindrical container wall has a first cylindrical wall section 11 having a radius R1 concentric to the agitator shaft 8, the second curved wall section 10 at its apex 13 has a radial distance R2 from the agitator shaft 8, which is smaller than R1.

Figure 2:
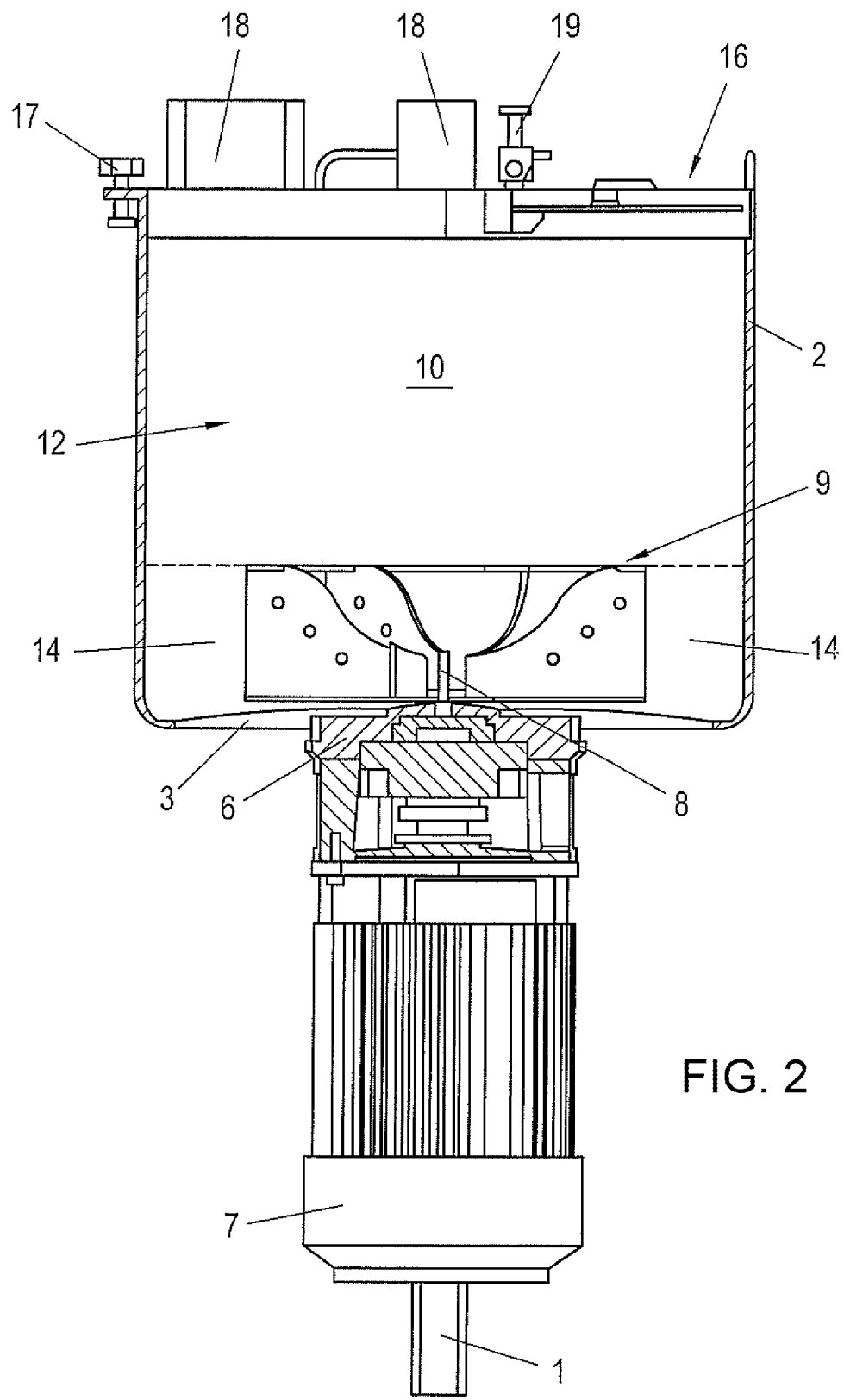
FIG. 2 shows a section according to the line II-II in FIG. 3.

The external free space 14 is shown schematically and by dashed lines in FIGS. 1 and 2, said free space having the height of the rotor body 9 and extending along the first cylindrical wall section 11 and along the second curved wall section 10 around the rotor body 9. As can be seen clearly in FIG. 1, the cross-sectional area of the free space 14 with respect to the first cylindrical wall section is substantially larger than the cross-sectional area with respect to the second curved wall section 10. In this respect, the external free space is variable along its circumference since it decreases continuously from the lateral fastening points 34 of the second curved wall section 10 as far as the apex 13 and then increases again. As a result of this asymmetrical arrangement of the rotor body 9 with respect to the wall sections surrounding it, a surprisingly better mixing of the liquid or doughy baking mixture is accomplished than is the case with the known arrangement of a central agitator arrangement.

In FIG. 2 the mixing container is terminated by a cover 16 where the cover can be fixed down by means of closure screws 17. Feed devices are provided for supplying the necessary ingredients to be mixed to the mass to be agitated, i.e. filling openings 18 for powdery or doughy ingredients and nozzles 19 for supplying liquid ingredients and, for example, a washing solution. The filling openings 18 can, for example, be displaceably provided in the cover so that the filling takes place more in the centre or more at the periphery of the mixing container.

As can be deduced in particular from FIG. 3, the first cylindrical wall section 11 is concentric to the agitator shaft 8 whereas the second curved wall section 10 is offset with respect to this. In this respect, an asymmetric arrangement of the rotor body 9 is obtained in the mixing chamber 12. As a result of the narrowing of the external free space along the circumference of the rotor body, a good mixing takes place and the mixing mass is moved at pressure through the rotor body so that it is ensured that the entire mixer volume is subject to good mixing.

The ratio of the cross-sectional narrowing of the external free space along its circumference depends on the arrangement of the second curved wall section 10. This wall section can be disposed by suitable means at a greater or smaller distance from the periphery of the rotor body. In each case, the distance from the rotor body 9 is shortest at the apex 13 of the second curved wall section. The second wall section possibly has a radius R3 whose curvature central point is displaced by about 4% to 30% of the radius R1 with respect to the agitator shaft 8.

Figure 21:
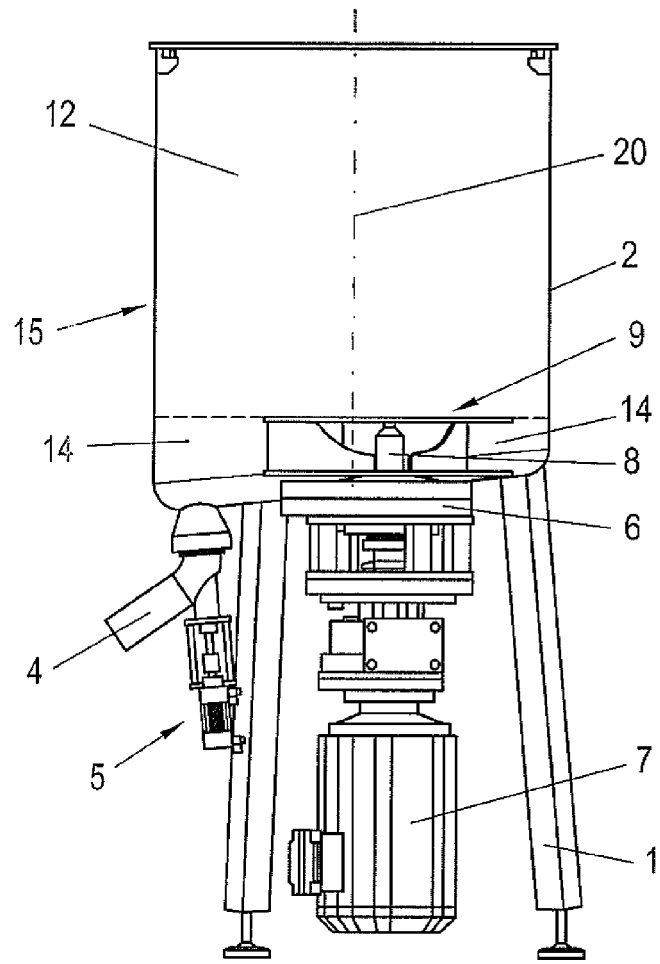
FIGS. 21 and 22 show a preferred alternative embodiment of the mixing apparatus in vertical section and plan view.
Figure 22:
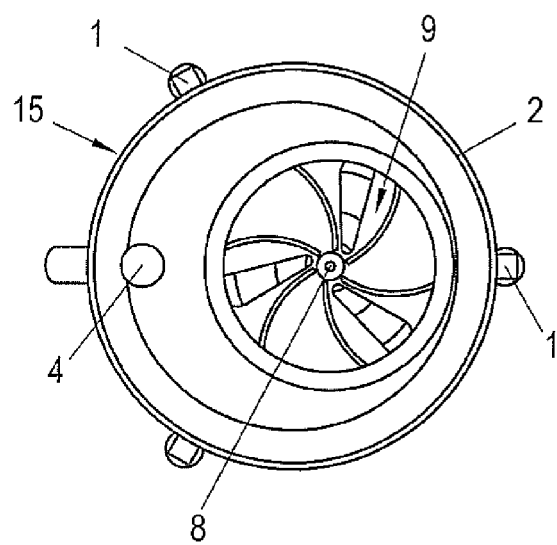

FIGS. 21 and 22 show a preferred alternative embodiment of the asymmetric arrangement of the rotor body 9. In this mixing apparatus the mixing container 15 and also the mixing chamber 12 are cylindrical. Differing from the known prior art, however the rotor body 9 driven by the agitator shaft 8 is at a distance from the cylinder axis 20 and approximately parallel thereto. Preferably the distance between cylinder axis and agitator shaft lies in the range of 2% to 5%, particularly preferably 2.5% to 10% of the inside diameter of the mixing container. For example, in the case of an inside diameter of the mixing container of about 700 mm and a rotor diameter of about 450 mm, the distance between cylinder axis 20 and agitator shaft 8 is about 20 mm. A preferred region lies between 20 mm and 70 mm with the said dimensions.

With this design according to FIGS. 21, 22, the second curved wall section inside the cylindrical mixing container is omitted. Otherwise the structure of the mixer is the same as that described above. In particular, this mixing container can also be closed by a cover.

The operating mode of all these mixing apparatus can be accomplished continuously or discontinuously.

In FIG. 21 the external free space 14 along the circumference of the rotor body 9 is also indicated schematically by dashed lines and this free space is also equipped with a variable cross-section.

Some examples for the rotor body used are described hereinafter.

Figure 5:
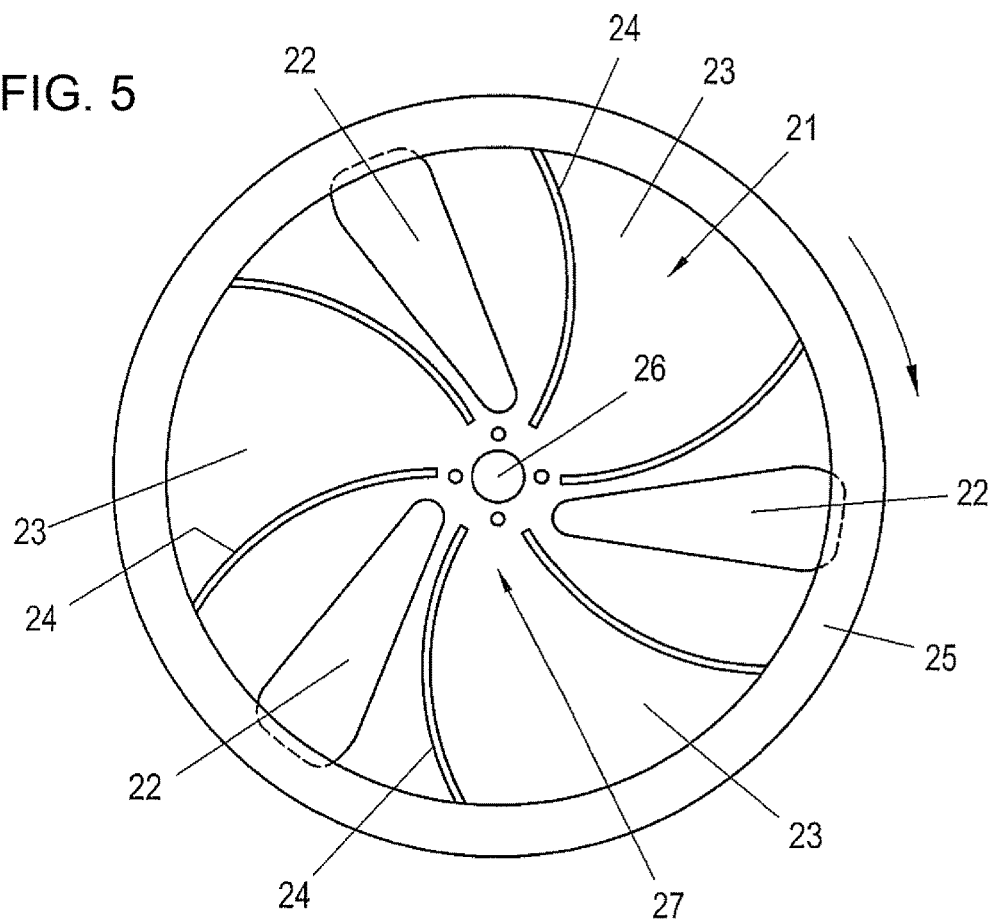
FIG. 5 shows the plan view of the first embodiment of the rotor body and FIG. 6 shows a side view of this rotor body.
Figure 6:
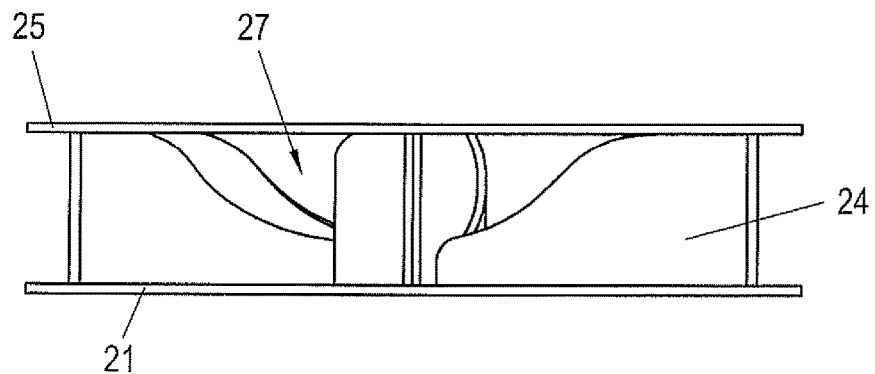
Figure 10:
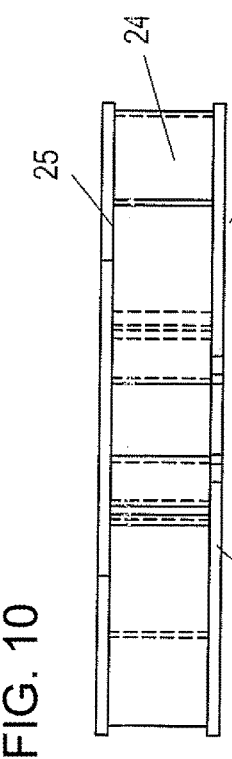
Figure 11:
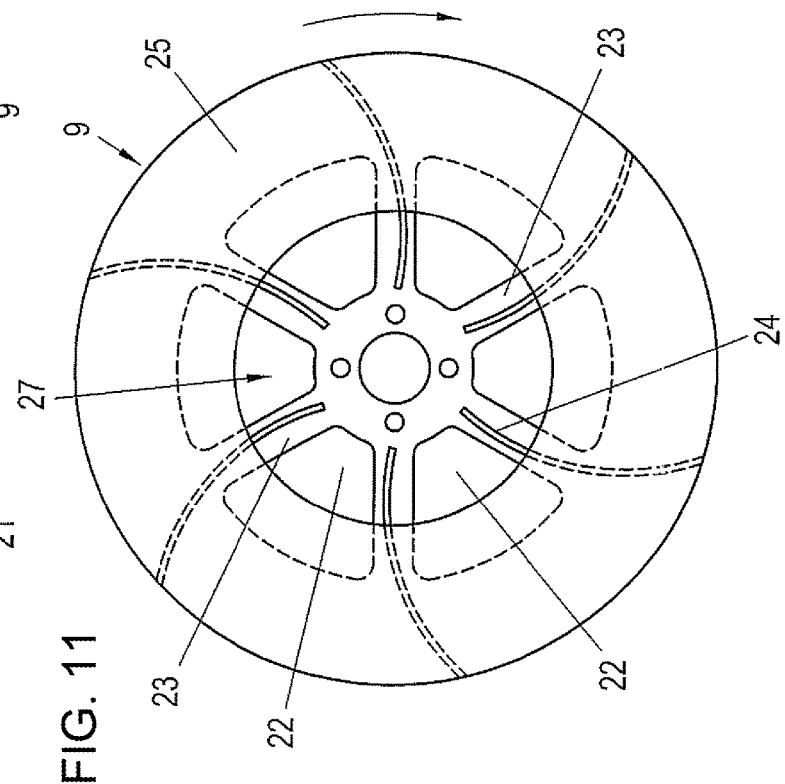
Figure 12:
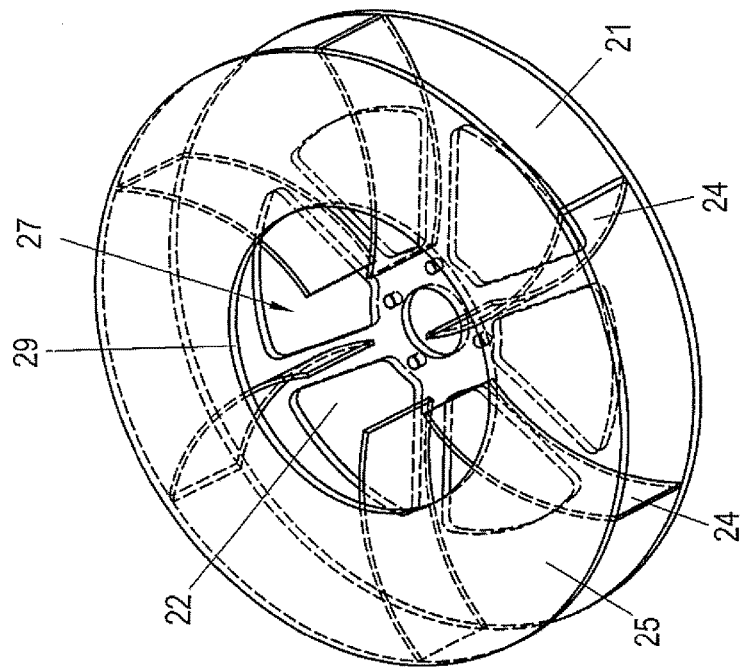

FIGS. 5 and 6 show in plan view and side view the rotor body built into the mixing apparatus shown in FIGS. 1 to 4 and FIGS. 21, 22. The rotor body has a base plate 21 which is provided with holes or openings 22. The webs 23 are provided between the openings 22. The substantially radial mixing vanes 24 are disposed on the webs 23 and a concentric terminating ring 25 is provided at the top on the mixing vanes parallel to the base plate 21. At a radial distance from the fastening hole 26 for the agitator shaft the mixing vanes 24 run radially outwards from a small initial height ascending to the height of the terminating ring. In the present exemplary embodiment the mixing vanes are curved towards the direction of rotation of the rotor body. Each of the webs carries two mixing vanes. The openings 22 extend from the central region close to the hole 26 as far as close to the outer circumference of the base plate.

The internal free space 27 is formed in the interior of the rotor body, through which the substance to be mixed can easily penetrate into the rotor body and can be distributed by this again into the mixing chamber. The mixing mass is pressed downwards through the openings 22 so that unmixed or poorly mixed ingredients are avoided under the base plate.

As has already been described, the external free space disposed on the outside around the rotor body brings about an additional mixing component as a result of its cross-sectional variations, with the result that the substance to be mixed is overall thoroughly mixed.

In FIGS. 7 to 9 the rotor body 9 also has a base plate which can be fastened onto the agitator shaft 8. An internal free space 27 of the rotor body 9 disposed above the agitator shaft 8 is provided above the base plate 21. Mixing vanes 24 disposed vertically on the base plate 21 are provided around the internal free space 27. Flow channels 28 running outwards from the internal free space 27 are provided between the mixing vanes 24, these flow channels being delimited towards the top by the terminating ring 25 which is connected to the upper edges of the mixing vanes 24. The terminating ring 25 contains a centrally disposed recess 29 which is disposed above the internal free space 27 of the rotor body 9.

In the exemplary embodiment of the rotor body 9 shown in FIGS. 7 to 9, this has additional mixing vanes 30 which project outwards over the outer edge of the terminating ring 25, which project into the external annular free space 14 disposed between the rotor body 9 and the cylindrical container wall of the mixing container 15. The additional mixing vanes 30 have a lower section 31 running parallel to the rotor axis of rotation and an upper section 32 running obliquely to the rotor axis of rotation. The lower sections 31 of the additional mixing vanes 30 running parallel to the rotor axis of rotation project downwards over the base plate 21 of the rotor body 9.

FIGS. 10 to 22 show a rotor body 9 in which vertically disposed mixing vanes 24 are provided between the base plate 21 and the terminating ring 25 provided with a central recess 29, which mixing vanes project with their inner end sections into the internal free space 27 of the rotor body 9. The mixing vanes 24 stand on the radially running webs 23 formed in the base plate 21. These webs are separated from one another by holes or openings 22 disposed in the base plate 21. Six webs arranged in a star shape are formed in the base plate 21, on which six mixing vanes 24 arranged in a star shape stand. The mixing vanes 24 are configured to be curved.

FIGS. 13 to 15 show another embodiment of the rotor body 9. In FIG. 14 the rotor body 9 is shown with the free space 14 surrounding it, which is shaped so that it is constricted by the second curved wall section 10 towards the apex 13 and then expands again to the cylindrical wall section 11. The star-shaped slightly curved mixing vanes 24 end outside on the circumferential line of the terminating ring 25 and project inwards into the internal free space 27, where the terminating ring 25 has a relatively large area and the internal free space is kept free.

Figure 18:
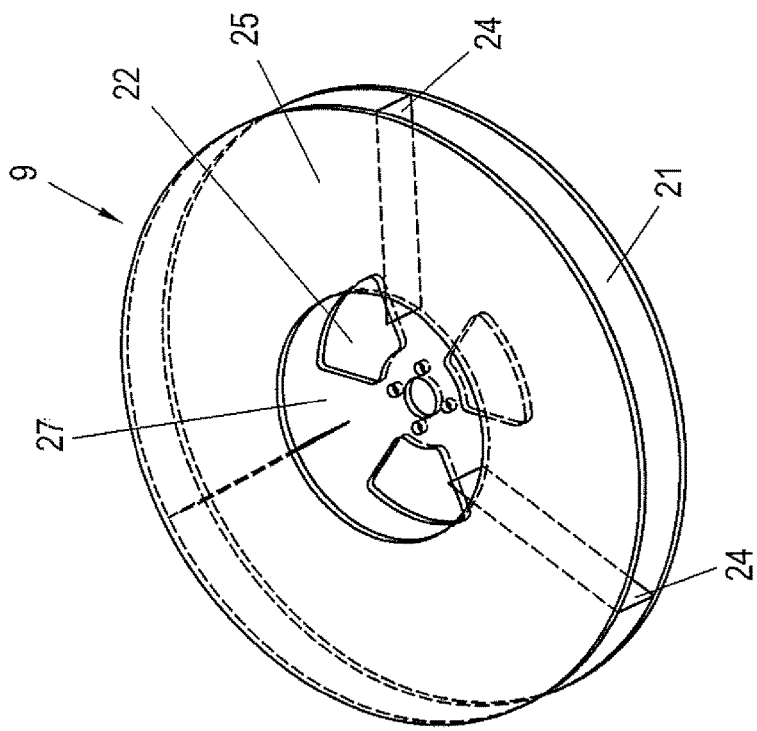
Figure 16:
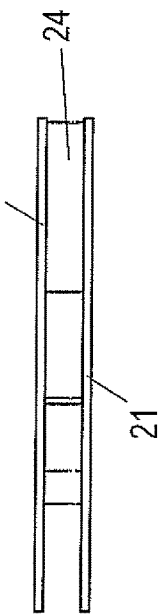
Figure 17:
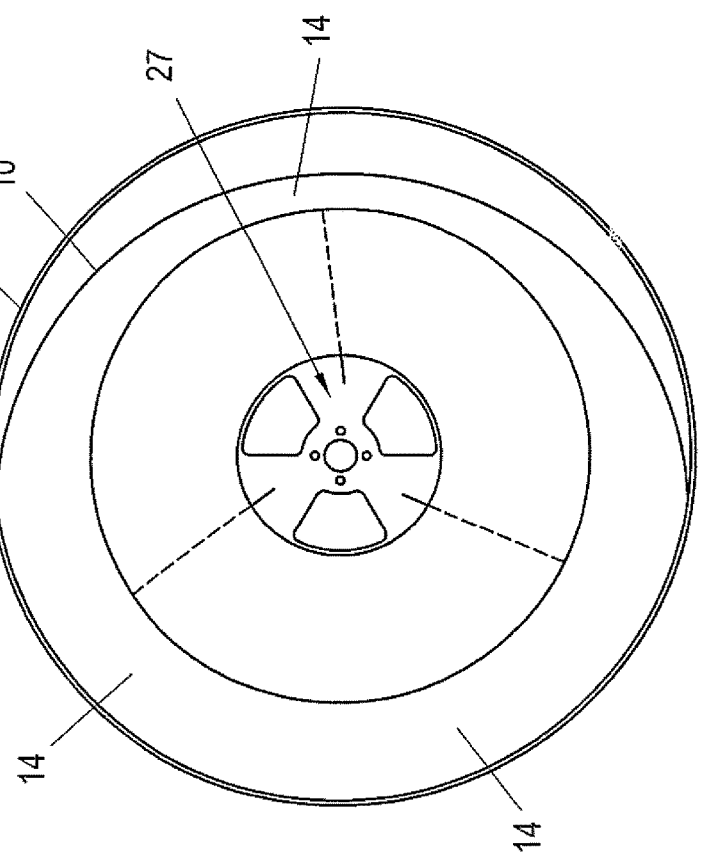

FIGS. 16 to 18 show a further embodiment of the rotor body, where only three straight radially disposed mixing vanes 24 and three openings 22 between these are provided. These mixing vanes 24 also project with their internal ends over a short distance into the internal free space 27 of the rotor body 9.

FIG. 17 shows how this rotor body is disposed in the cylindrical mixing container 15 and how as a result of the second curved wall section 10 use, the external free space 14 around the rotor body 9 has a cross-section which tapers and then expands again.

Figure 19:
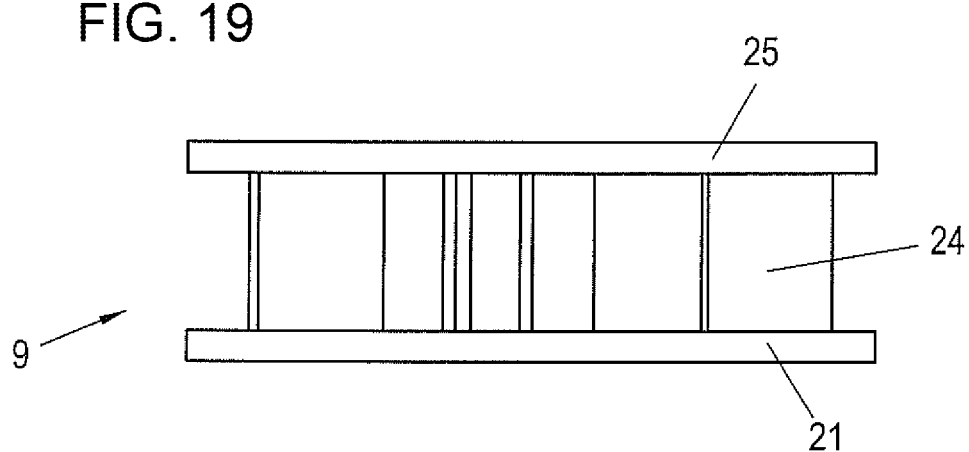
Figure 20:
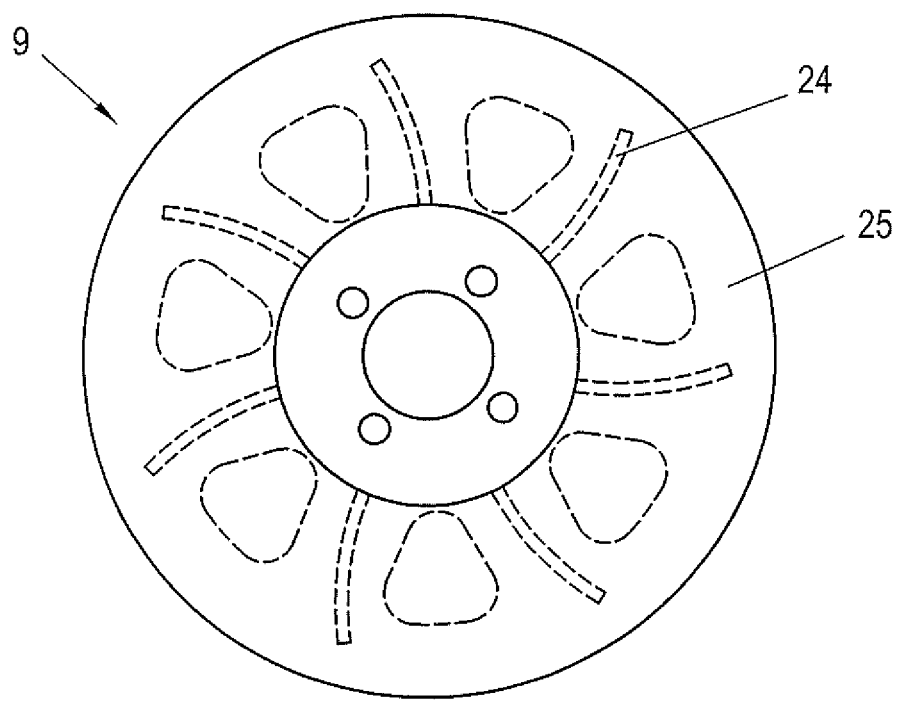

FIGS. 19 and 20 show side view and plan view of another rotor body whose design is self-explanatory in view of the previous descriptions of the design. This comprises a rotor body having relatively small dimensions, where the mixing vanes 24 extend in a slightly curved manner in the radial direction from the external circumferential line of the base plate 21 to the internal circumferential line of the terminating ring 25.

FIG. 23 shows purely schematically a plan view of the mixing apparatus similar to FIG. 22, where the agitator shaft is variable in its distance from the cylinder axis 20 of the cylindrical container. As a result of this variability of the distance, the distance between the outer edge of the rotor body 9 and the container wall 2 and therefore the extent of constriction of the free space 14 is adjustable.

It is thereby possible to match the agitating behaviour to the other agitation parameters such as, for example, to the rotational speed of the rotor body, to the dough composition and to the amount of dough.

For this purpose a circular cut-out 35 is provided in the container base in which the bearing plate 6 is inserted rotatably but sealed. In the bearing plate 6 the agitator shaft 8 is mounted from bottom to top leading to the rotor body 9, where the bearing position lies outside the axis of rotation 36 of the bearing plate. The agitator motor can be flanged-mounted from below on the bearing plate.

The position of the agitator shaft and the relevant rotor body 9 indicated by the continuous line in FIG. 23 is the position with the greatest proximity to the container wall 2.

The positions 8' to 8''' for the agitator shaft 8 are indicated by the dashed line, for example and are set by appropriately twisting the bearing plate according to the arrow 37.

For better clarity, the rotor body 9 is only indicated as a circle in one position and without the relevant mixing vanes.

The mounting of the bearing plate 6 in the cut-out 35 can be selected arbitrarily by the person skilled in the art. In addition to the necessary skill, the tightness of the container base and easy cleaning should also be maintained. This can be achieved, for example, by stepped formation of the cut-out 35 in the container base and sealing with a circumferential sealing ring.

The scope of adjustment of the agitator shaft is shown somewhat exaggerated in FIG. 23. In practical implementation a scope for adjustment of the order of magnitude of about 10% of the rotor body diameter is sufficient, where this should not be understood as limitation of the adjustability.

| Reference numbers: | |
|---|---|
| 1. | Frame |
| 2. | Cylindrical container wall |
| 3. | Container base |
| 4. | Outlet tube |
| 5. | Closing apparatus |
| 6. | Bearing plate |
| 7. | Agitator motor |
| 8. | Agitator shaft |
| 9. | Rotor body |
| 10. | Second curved wall section |
| 11. | First cylindrical wall section |
| 12. | Mixing chamber |
| 13. | Apex |
| 14. | External free space |
| 15. | Cylindrical container |
| 16. | Cover |
| 17. | Closure screws |
| 18. | Filling openings |
| 19. | Nozzle |
| 20. | Cylinder axis |
| 21. | Base plate |
| 22. | Openings |
| 23. | Webs |
| 24. | Mixing vanes |
| 25. | Terminating ring |
| 26. | Fastening hole |
| 27. | Internal free space |
| 28. | Flow channels |
| 29. | Central recess |
| 30. | Additional mixing vane |
| 31. | Lower section |
| 32. | Upper section |
| 33. | Curvature central point |
| 34. | Lateral fastening point |
| 35. | Circular cut-out |
| 36. | Axis of rotation of bearing plate |
| 37. | Arrow |
| R1 | Radius of first cylindrical wall section |
| R2 | Radial distance |
| R3 | Radius of second curved wall section |

The invention claimed is:

1. A mixing apparatus, comprising:
   an upwardly open mixing container disposed in an upper part of the mixing apparatus, said mixing container having a base, a container wall, and a central cylinder axis;
   a single-shaft agitator disposed in a lower part of the mixing apparatus, said agitator including a vertically disposed agitator shaft and an agitating tool fastened to said agitator shaft, said agitating tool being a rotor body disposed in said mixing container just above said container base;
   said single-shaft agitator being a statorless agitator and said rotor body being surrounded by an external free space between said rotor body and said container wall of said mixing container; and
   wherein said agitator shaft is adjustably mounted for adjusting a spacing distance thereof from said cylinder axis; and
   wherein said agitator shaft is mounted in a circularly configured and rotatably mounted bearing plate in a circular section of said container base, and a mounting is radially offset to an axis of rotation of said bearing plate.

2. The mixing apparatus according to claim 1, wherein said container wall is cylindrical and said agitator shaft is disposed parallel to and at a spacing distance from said cylinder axis.

3. The mixing apparatus according to claim 2, wherein a diameter of said rotor body is 45 to 75% of an inside diameter of said mixing container.

4. The mixing apparatus according to claim 3, wherein a distance between said cylinder axis and said agitator shaft lies within a range of 2% to 15% of said inside diameter of said mixing container.

5. The mixing apparatus according to claim 1, which comprises a cover for closing a top of said mixing container, said top being provided with feed devices including filling openings for dough ingredients to be mixed and nozzles for injecting liquid dough ingredients or cleaning liquids.

6. The mixing apparatus according to claim 5, wherein a position of said feed devices is adjustable.

7. The mixing apparatus according to claim 1, which comprises an outlet tube mounted at said container base and a closing apparatus for selectively closing or opening said outlet tube.

8. The mixing apparatus according to claim 7, wherein said container base is inclined towards said outlet tube.

9. The mixing apparatus according to claim 1, wherein said rotor body comprises a base plate formed with openings and webs, substantially radial mixing vanes disposed on said webs, and a concentric terminating ring disposed parallel to said base plate.

10. The mixing apparatus according to claim 9, wherein said mixing vanes are formed at a radial distance from said agitator shaft beginning from a small initial height and ascending radially outwards towards said terminating ring.

11. The mixing apparatus according to claim 9, wherein said mixing vanes are curved towards a direction of rotation of said rotor body.

12. The mixing apparatus according to claim 9, wherein said openings in said base plate each extend from a center thereof as far as to a vicinity of an outer edge thereof.

13. The mixing apparatus according to claim 9, wherein each of said webs carries two said mixing vanes.

14. The mixing apparatus according to claim 1, which comprises a second curved wall section disposed in said mixing container and having a smaller height than said cylindrical mixing container.

15. The mixing apparatus according to claim 1, wherein said rotor body comprises a plurality of mixing vanes arranged in a star shape.

16. The mixing apparatus according to claim 15, wherein said mixing vanes are curved mixing vanes.

17. The mixing apparatus according to claim 15, wherein said mixing vanes are radially extending mixing vanes.

18. The mixing apparatus according to claim 15, wherein at said rotor body said mixing vanes that are arranged in a star shape project with inner end sections thereof into an inner free space of said rotor body.

19. The mixing apparatus according to claim 15, wherein at said rotor body said mixing vanes that are arranged in a star shape project with outer end sections thereof outwards over an outer edge of a terminating ring of said rotor body and project into said external annular free space between said rotor body and said cylindrical container wall of said mixing container.

20. The mixing apparatus according to claim 15, wherein said rotor body comprises a terminating ring and additional mixing vanes projecting outwards over an outer edge of said terminating ring, and said additional mixing vanes project into the external annular free space between said rotor body and said container wall of said mixing container.

21. The mixing apparatus according to claim 20, wherein said additional mixing vanes are formed in one piece with said mixing vanes disposed between a base plate and said terminating ring of said rotor body.

22. The mixing apparatus according to claim 20, wherein said additional mixing vanes comprise a lower section extending parallel to the axis of rotation of said rotor and an upper section extending obliquely to said axis of rotation of said rotor.

23. The mixing apparatus according to claim 20, wherein said rotor body is formed with a base plate and said additional mixing vanes project downwards over said base plate of said rotor body.

24. The mixing apparatus according to claim 1, wherein said rotor body comprises a base plate fastened to said agitator shaft, and wherein two or more webs delimited by holes or openings are provided at said base plate of said rotor body in a region adjoining said agitator shaft towards the outside.

* * * * *